(12) United States Patent
Hoelter et al.

(10) Patent No.: US 9,001,212 B2
(45) Date of Patent: *Apr. 7, 2015

(54) INFRARED TRANSMISSIVE DOME SYSTEMS AND METHODS

(75) Inventors: Theodore R. Hoelter, Goleta, CA (US); Barbara Sharp, Santa Barbara, CA (US); Warn Burt, Solvang, CA (US); Robert Pietsch, Goleta, CA (US); Marcel Tremblay, Goleta, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 1165 days.

This patent is subject to a terminal disclaimer.

(21) Appl. No.: 12/721,921

(22) Filed: Mar. 11, 2010

(65) Prior Publication Data
US 2011/0221908 A1     Sep. 15, 2011

(51) Int. Cl.
| | |
|---|---|
| *H04N 5/33* | (2006.01) |
| *B29C 43/36* | (2006.01) |
| *G01J 5/04* | (2006.01) |
| *G01J 5/08* | (2006.01) |
| *B29C 43/02* | (2006.01) |
| *G01J 5/00* | (2006.01) |

(52) U.S. Cl.
CPC ............. *B29C 43/36* (2013.01); *B29C 43/021* (2013.01); *B29C 2043/3615* (2013.01); *G01J 5/04* (2013.01); *G01J 5/046* (2013.01); *G01J 5/08* (2013.01); *G01J 5/0806* (2013.01); *G01J 5/0875* (2013.01); *G01J 2005/0077* (2013.01)

(58) Field of Classification Search
CPC .................................. H04N 5/33; H04N 5/332
USPC .................... 348/164; 359/350, 359; 264/1.1; 250/330
See application file for complete search history.

(56) References Cited

U.S. PATENT DOCUMENTS

| | | | |
|---|---|---|---|
| 4,051,769 | A | 10/1977 | Nickerson et al. |
| 4,059,126 | A | 11/1977 | Nickerson |
| 4,073,985 | A | 2/1978 | San Miguel |

(Continued)

FOREIGN PATENT DOCUMENTS

| | | |
|---|---|---|
| CN | 1314837 | 9/2001 |
| CN | 1675051 | 9/2005 |

(Continued)

OTHER PUBLICATIONS

Weimer et al., Advances in Low-Cost Long-Wave Infrared Polymer Windows, Part of the SPIE Conference on Windows and Dome Technologies and Materials VI, Apr. 1999, SPIE vol. 3705, Orlando, Florida, pp. 276-281.

(Continued)

*Primary Examiner* — Rafferty Kelly
(74) *Attorney, Agent, or Firm* — Haynes and Boone, LLP

(57) ABSTRACT

Systems and methods are disclosed that provide an infrared-transmissive dome, such as for infrared imaging applications. For example, an infrared-transmissive dome, for an embodiment, includes a main body providing a hollow, hemispherical-shaped dome; wherein the main body is made of an ultra-high molecular weight or a very-high molecular weight polyethylene material; and wherein the main body has a wall thickness equal to or less than approximately 0.012 inches to allow infrared transmittance greater than approximately sixty five percent through the main body for infrared imaging in a wavelength range of approximately three to fourteen micrometers.

34 Claims, 6 Drawing Sheets

(56) References Cited

U.S. PATENT DOCUMENTS

| | | | |
|---|---|---|---|
| 4,168,717 A | 9/1979 | Rinker | |
| 4,191,168 A | 3/1980 | Allen et al. | |
| 4,346,696 A | 8/1982 | Brunet | |
| 4,708,419 A | 11/1987 | Scherber et al. | |
| 4,930,864 A * | 6/1990 | Kuster et al. | 359/350 |
| 5,083,025 A | 1/1992 | Blomberg | |
| 5,134,292 A | 7/1992 | Segawa et al. | |
| 5,159,200 A | 10/1992 | Dunbar et al. | |
| 5,195,720 A | 3/1993 | Nortier et al. | |
| 5,221,919 A | 6/1993 | Hermans | |
| 5,244,179 A | 9/1993 | Wilson | |
| 5,324,586 A | 6/1994 | Klocek et al. | |
| 5,525,802 A | 6/1996 | Hoggins et al. | |
| 5,532,048 A | 7/1996 | Klocek et al. | |
| 5,573,824 A | 11/1996 | Klocek et al. | |
| 5,629,074 A | 5/1997 | Klocek et al. | |
| 5,879,607 A | 3/1999 | Klocek et al. | |
| 5,935,651 A | 8/1999 | Klocek et al. | |
| 6,040,523 A | 3/2000 | Cunningham | |
| 6,051,836 A | 4/2000 | Kirihata et al. | |
| 6,077,381 A | 6/2000 | Klocek et al. | |
| 6,083,583 A | 7/2000 | Klocek et al. | |
| 6,160,661 A * | 12/2000 | Klocek et al. | 359/359 |
| 6,200,680 B1 * | 3/2001 | Takeda et al. | 428/402 |
| 6,222,191 B1 | 4/2001 | Myron et al. | |
| 6,417,783 B1 | 7/2002 | Gabler et al. | |
| 6,480,103 B1 | 11/2002 | McCarthy et al. | |
| 6,485,081 B1 | 11/2002 | Bingle et al. | |
| 6,621,411 B2 | 9/2003 | McCarthy et al. | |
| 6,649,092 B2 * | 11/2003 | Vicker et al. | 264/1.7 |
| 6,783,167 B2 | 8/2004 | Bingle et al. | |
| 6,818,881 B1 | 11/2004 | Chernichovski et al. | |
| 6,881,957 B2 | 4/2005 | Dougherty et al. | |
| 6,889,818 B2 | 5/2005 | Stacey | |
| 6,955,603 B2 | 10/2005 | Jeffway et al. | |
| 7,011,460 B1 | 3/2006 | Todd et al. | |
| 7,097,226 B2 | 8/2006 | Bingle et al. | |
| 7,224,398 B2 | 5/2007 | Wada | |
| 7,236,299 B1 | 6/2007 | Smith | |
| 7,306,383 B2 | 12/2007 | Jones et al. | |
| 2002/0176158 A1 * | 11/2002 | Minami et al. | 359/356 |
| 2003/0093805 A1 | 5/2003 | Gin | |
| 2004/0075739 A1 | 4/2004 | Wada | |
| 2005/0253294 A1 | 11/2005 | Takano et al. | |
| 2006/0028442 A1 | 2/2006 | Bynum et al. | |
| 2006/0043295 A1 | 3/2006 | Satou et al. | |
| 2006/0269104 A1 | 11/2006 | Ciolli | |
| 2007/0045524 A1 | 3/2007 | Rains, Jr. et al. | |
| 2008/0104903 A1 | 5/2008 | Jaster | |
| 2008/0165075 A1 | 7/2008 | Adair et al. | |

FOREIGN PATENT DOCUMENTS

| | | |
|---|---|---|
| CN | 101451901 | 6/2009 |
| JP | 2004159236 | 6/2004 |
| WO | WO0000334 | 1/2000 |

OTHER PUBLICATIONS

Brette et al., Engineered polymeric IR-transparent protective coatings, Sep. 1994, SPIE vol. 2286, Dallas, Texas, pp. 325-334.
Gantz, Thermal Imaging Technology, Fixed Thermal Cameras, http://cbceurope.co./uk/CCTV/ganz/details.php?pid=7093, printed Oct. 1, 2009, 4 pages.
Silent Sentinel Professional Imaging Products, TMD-3 Ti Dome, datasheet DN083706-1.0, Oct. 2009, 2 pages.
KUBE Electronics Ltd., General Specification, Quality Control Scheme and Aging / Degradation of KUBE Plastics for PIR Windows and Lenses, Switzerland, Feb. 2009, pp. 1-7.
Stamylan UH 034—DSM EP—Polyethylene, Ultra High Molecular Weight Plastic, IDES, The Plastic Web, http://www.ides.com/grades/ds/E103027.htm, printed Aug. 23, 2009, 1 page.
Stamylan UH 034, Unlimited DSM, Product Data Sheet, Ref.: PDS UH UH034, Feb. 12, 2008, 1 page.
IDES, The Plastic Web, GUR 4150—Ticona—Polyethylene, Ultra High Molecular Weight Plastic, http://www.ides.com/grades/ds/E18998.htm, printed Aug. 23, 2009, 1 page.
Layfield, UV Resistance, http://www.layfieldenvironmental.com/pages/EGI/Specifications.aspx?id=5030, printed Mar. 8, 2010, 2 pages, (http://www.geomembranes.com/index_resources.cfm?copyID=30&ID=geo&type=tech.

* cited by examiner

INFRARED TRANSMISSIVE DOME SYSTEMS AND METHODS

TECHNICAL FIELD

One or more embodiments of the invention relate generally to infrared applications and, more particularly, to an infrared-transmissive dome, such as for thermal infrared camera systems.

BACKGROUND

Thermal infrared cameras (e.g. cameras that image wavelengths in the range of three to fourteen micrometers) are well known and employed in a wide variety of applications. A typical thermal infrared camera, often referred to simply as an infrared camera or IR camera, uses an infrared detector to detect infrared energy that is provided to the infrared detector through the infrared camera's lens. The infrared camera may also include a display for a user to view images generated by the infrared camera based on the infrared energy, or the images may be stored by the infrared camera or transmitted (e.g., via a wireless or wired network) for remote viewing and/or storage.

When designed for outdoor use, for example, the infrared camera may be manufactured to be weatherproof, with for example weatherproof seals and tight manufacturing tolerances between housing components, which may significantly increase manufacturing costs. Alternatively, an infrared-transmissive window may be used to form one side of an enclosure to protect the infrared camera and through which the infrared camera may receive infrared energy to generate images for storing and/or viewing by a user on a display. However, the infrared-transmissive window is typically made of expensive materials (e.g., germanium), which may be fragile and easily damaged and add significantly to the cost of the infrared camera system.

Other conventional, less expensive infrared-transmissive windows exist (e.g., made of conventional high density polyethylene or other polymer materials) for passive infrared (PIR) motion detection applications. However, these conventional polymer materials typically have strong absorptions that limit infrared transmission and other undesirable properties (e.g., non-uniformities, excessive thicknesses, and inadequate structural integrity at desired dimensions), which make these conventional polymer materials unsuitable for thermal infrared imaging applications.

As a result, there is a need for infrared-transmissive materials and techniques, which for example may be suitable for providing a dome for thermal infrared camera imaging applications.

SUMMARY

In accordance with one embodiment, an infrared-transmissive dome includes a main body providing a hollow, hemispherical-shaped dome; wherein the main body is made of an ultra-high molecular weight or a very-high molecular weight polyethylene material; and wherein the main body has a wall thickness equal to or less than approximately 0.012 inches to allow infrared transmittance greater than approximately sixty five percent through the main body for infrared imaging in a wavelength range of three to fourteen micrometers.

In accordance with another embodiment, a compression mold for an infrared-transmissive dome includes a first mold portion having a convex portion; and a second mold portion having a concave portion corresponding to the convex portion of the first mold portion; wherein the convex portion disposed within the concave portion is configured to provide an approximately 0.012 gap or less between the convex portion and the concave portion such that an ultra-high molecular weight or a very-high molecular weight polyethylene material disposed between the convex portion and the concave portion, under an elevated temperature and with a compressive force applied to the compression mold, forms the infrared-transmissive dome having a wall thickness equal to or less than approximately 0.012 inches.

In accordance with another embodiment, a method of forming an infrared-transmissive dome includes providing an ultra-high molecular weight or a very-high molecular weight polyethylene material within a compression mold to form the infrared-transmissive dome; increasing a temperature of the compression mold; applying pressure to the ultra-high molecular weight or very-high molecular weight polyethylene material via the compression mold; removing the ultra-high molecular weight or very-high molecular weight polyethylene material from the compression mold, wherein the ultra-high molecular weight or very-high molecular weight polyethylene material has been formed to provide a hollow, hemispherical-shaped dome having a main body with a wall thickness equal to or less than approximately 0.012 inches.

The scope of the invention is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Systems and methods are disclosed in accordance with one or more embodiments to provide an infrared-transmissive dome for infrared imaging applications. For example, for an embodiment, a polymer-based infrared-transmissive dome is provided to partially enclose an infrared camera and allow the infrared camera to capture infrared images based on infrared energy passing through the dome.

In one or more embodiments, the dome may be used for indoor and/or outdoor infrared imaging applications and may provide weatherproof protection for the infrared camera. For some embodiments, the dome may further obscure viewing of the infrared camera based on visible light wavelengths (e.g., via the naked eye or through visible light imagers), which may be desired, for example, for security applications to prevent observation of the infrared camera and its pointing direction.

Figure 1:
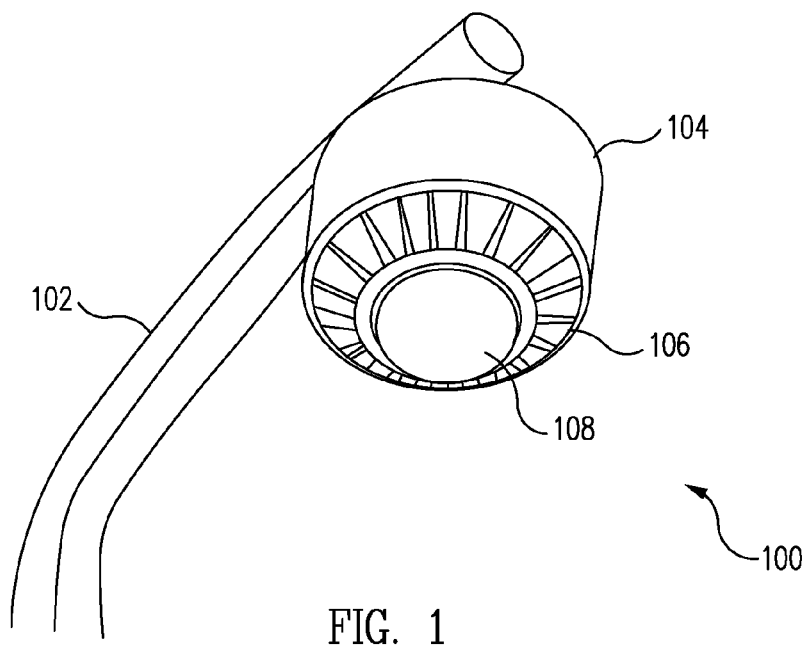
FIG. 1 shows a perspective view of an infrared camera system having an infrared-transmissive dome in accordance with an embodiment.

As an example, FIG. 1 shows a perspective view of an infrared camera system 100 having an infrared-transmissive dome 108 in accordance with an embodiment. Infrared (IR) camera system 100 may be viewed as illustrating generally an infrared camera surveillance system, with the infrared camera contained within a housing 104 that may be mounted, for example, on a support structure 102. Housing 104 may further include a faceplate 106, with IR-transmissive dome 108 coupled to faceplate 106 to allow infrared energy to pass through IR-transmissive dome 108 to the infrared camera (e.g., infrared detector) within housing 104. The infrared camera may represent a conventional infrared camera and may further include conventional movement mechanisms (e.g., a pan/tilt mechanism to allow movement and pointing of the infrared camera) as would be understood by one skilled in the art.

It should be understood that IR camera system 100 represents an example implementation of IR-transmissive dome 108 for IR imaging applications and that housing 104, faceplate 106, and support structure 102 represent a structural example and should not be viewed as limiting for one or more embodiments. Rather, housing 104 may represent any type of enclosure generally that utilizes IR-transmissive dome 108 to form a portion of the enclosure and allow infrared energy to pass through IR-transmissive dome 108 to an infrared camera within the enclosure. The infrared camera may represent any type of infrared detector that may form part of an infrared camera system (e.g., any type of thermal infrared imaging device) within the enclosure or that may be coupled via a wireless or wired network to capture, store, provide, and/or display infrared images.

Figure 2:
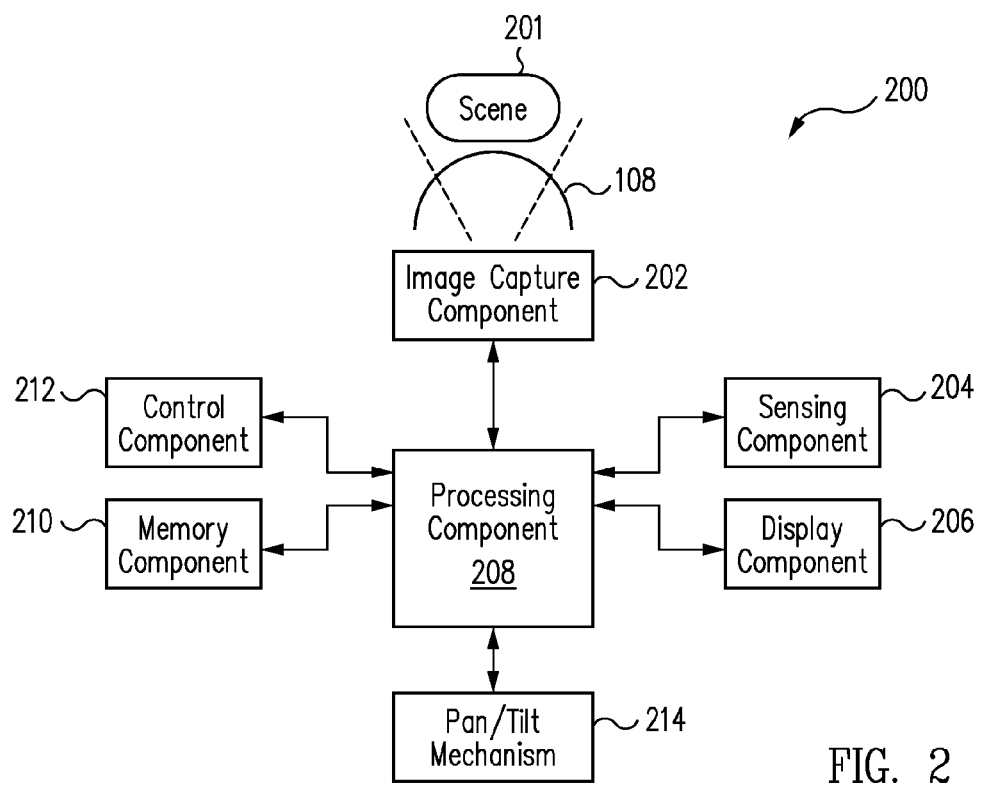
FIG. 2 shows a block diagram illustrating an infrared camera system in accordance with an embodiment.

FIG. 2 shows a block diagram illustrating an IR camera system 200 in accordance with an embodiment. IR camera system 200 may represent a functional block diagram of an IR imaging system that may obtain IR images (e.g., of a scene 201) via IR energy passing through IR-transmissive dome 108. For example, IR camera system 200 may represent an example implementation for the IR camera of IR camera system 100 (FIG. 1).

IR camera system 200 may include, for example, an image capture component 202, a processing component 208, a memory component 210, and a control component 212. IR camera system 200 may further include a sensing component 204, a display component 206, and a movement mechanism (e.g., a pan/tilt mechanism) 214.

IR camera system 200 may represent, for example, an infrared imaging device, such as an infrared camera, to capture and process images, such as video images of scene 201. IR camera system 200 may represent any type of infrared imaging system that employs one or more IR detectors which are thermally isolated from the surrounding environment. IR camera system 200 may comprise a portable device and may be handheld and/or incorporated, for example, into a vehicle (e.g., an automobile or other type of land-based vehicle) or a non-mobile installation requiring infrared images to be stored and/or displayed or may comprise a distributed networked system (e.g., processing component 208 distant from and controlling image capture component 202 via the network).

Movement mechanism 214 may optionally form part of IR camera system 200 to provide movement and pointing alignment of IR camera system 200 (e.g., at least some portion of IR camera system 200) to control camera direction and pointing such that image capture component 202 may capture desired images of interest, as would be understood by one skilled in the art. As an example, movement mechanism 214 may be controlled by processing component 208 (e.g., via control component 212) or by a separate logic/control circuit.

In various embodiments, processing component 208 may comprise any type of a processor or a logic device (e.g., a programmable logic device (PLD) configured to perform processing functions). Processing component 208 may be adapted to interface and communicate with components 202, 204, 206, 210, 212, and/or 214 to perform method and processing steps and/or operations, such as controlling biasing and other functions (e.g., values for elements such as variable resistors and current sources, switch settings for biasing and timing, and other parameters) along with conventional system processing functions as would be understood by one skilled in the art.

Memory component 210 comprises, in one embodiment, one or more memory devices adapted to store data and information, including for example infrared data and information. Memory device 210 may comprise one or more various types of memory devices including volatile and non-volatile memory devices, including computer-readable medium (portable or fixed). Processing component 208 may be adapted to execute software stored in memory component 210 so as to perform method and process steps and/or operations described herein.

Image capture component 202 comprises, in one embodiment, one or more infrared sensors (e.g., any type of multi-pixel infrared detector, such as a focal plane array) for capturing infrared image data (e.g., still image data and/or video data) representative of an image, such as scene 201. In one implementation, the infrared sensors of image capture component 202 provide for representing (e.g., converting) the captured image data as digital data (e.g., via an analog-to-digital converter included as part of the infrared sensor or separate from the infrared sensor as part of IR camera system 200). In one or more embodiments, image capture component 202 may further represent or include a lens, a shutter, and/or other associated components for capturing infrared image data. Image capture component 202 may further include temperature sensors (or temperature sensors may be distributed within IR camera system 200) to provide temperature information to processing component 208 as to an operating temperature of image capture component 202.

As an example, the infrared image data (e.g., infrared video data) may comprise non-uniform data (e.g., real image data) of an image, such as scene 201. Processing component 208 may be adapted to process the infrared image data (e.g., to provide processed image data), store the infrared image data in memory component 210, and/or retrieve stored infrared image data from memory component 210. For example, processing component 208 may be adapted to process infrared image data stored in memory component 210 to provide processed image data and information (e.g., captured and/or processed infrared image data).

Control component 212 comprises, in one embodiment, a user input and/or interface device, such as a rotatable knob (e.g., potentiometer), push buttons, slide bar, keyboard, etc., that is adapted to generate a user input control signal. Processing component 208 may be adapted to sense control input signals from a user via control component 212 and respond to any sensed control input signals received therefrom. Processing component 208 may be adapted to interpret such a control input signal as a parameter value, as generally understood by one skilled in the art. In one embodiment, control component 212 may comprise a control unit (e.g., a wired or wireless handheld control unit) having push buttons adapted to interface with a user and receive user input control values. In one implementation, the push buttons of the control unit may be used to control various functions of the IR camera system 200, such as autofocus, menu enable and selection, field of view, brightness, contrast, noise filtering, high pass filtering, low pass filtering, and/or various other features as understood by one skilled in the art.

Display component 206 comprises, in one embodiment, an image display device (e.g., a liquid crystal display (LCD) or various other types of generally known video displays or monitors or eyepiece displays). Processing component 208 may be adapted to display image data and information on the display component 206. Processing component 208 may be adapted to retrieve image data and information from memory component 210 and display any retrieved image data and information on display component 206. Display component 206 may comprise display electronics, which may be utilized by processing component 208 to display image data and information (e.g., infrared images). Display component 206 may be adapted to receive image data and information directly from image capture component 202 via the processing component 208, or the image data and information may be transferred from memory component 210 via processing component 208.

Optional sensing component 204 comprises, in one embodiment, one or more sensors of various types, depending on the application or implementation requirements, as would be understood by one skilled in the art. The sensors of optional sensing component 204 provide data and/or information to at least processing component 208. In one aspect, processing component 208 may be adapted to communicate with sensing component 204 (e.g., by receiving sensor information from sensing component 204) and with image capture component 202 (e.g., by receiving data and information from image capture component 202 and providing and/or receiving command, control, and/or other information to and/or from one or more other components of IR camera system 200).

In various implementations, sensing component 204 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder), and/or whether a tunnel or other type of enclosure has been entered or exited. Sensing component 204 may represent conventional sensors as generally known by one skilled in the art for monitoring various conditions (e.g., environmental conditions) that may have an effect (e.g., on the image appearance) on the data provided by image capture component 202.

In some implementations, optional sensing component 204 (e.g., one or more of sensors) may comprise devices that relay information to processing component 208 via wired and/or wireless communication. For example, optional sensing component 204 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques.

In various embodiments, components of IR camera system 200 may be combined and/or implemented or not, as desired or depending on the application or requirements, with IR camera system 200 representing various functional blocks of a related system. In one example, processing component 208 may be combined with memory component 210, image capture component 202, display component 206, and/or optional sensing component 204. In another example, processing component 208 may be combined with image capture component 202 with only certain functions of processing component 208 performed by circuitry (e.g., a processor, a microprocessor, a logic device, a microcontroller, etc.) within image capture component 202. Furthermore, various components of IR camera system 200 may be remote from each other (e.g., image capture component 202 may comprise a remote sensor with processing component 208 representing a computer that may or may not be in communication with image capture component 202).

FIGS. 3A through 3D show a top level view, a cross-sectional side view, an expanded portion of the cross-sectional side view, and a top perspective view, respectively, of an IR-transmissive dome 300 in accordance with an embodiment. IR-transmissive dome 300 may represent an example implementation of IR-transmissive dome 108, but this specific implementation is not limiting.

IR-transmissive dome 300 represents a hollow, hemispherical dome having a main dome body 302 and an optional flange 304, with IR-transmissive dome 300 having varying diameter and dimensions, depending upon the desired application and specific size requirements. For example, IR-transmissive dome 300 is shown as having a nominal wall thickness of 0.008 inches (±0.002 inches), an inner diameter of 4.924 inches (+0.000, −0.050 inches), and an outer diameter (including flange 304) of 5.440 inches (+0.050, −0.000).

However, as noted, these dimensions are merely examples and are not limiting. As an example, for one or more embodiments, the wall thickness may be 0.008 inches or may fall within a range from 0.012 to 0.005 inches or less, depending upon the desired application (e.g., requirements of structural rigidity, materials, diameter, and IR transmission properties). As another example for an embodiment, IR-transmissive dome 300 may have a square wave response greater than 75% at 4.75 pixels per cycle for the long wave IR (LWIR) spectrum (e.g., nominally 8-12 micrometers).

As a further example for an embodiment, IR-transmissive dome 300 may vary in diameter, for example, from 3 inches to 10 inches, with a wall thickness to dome diameter ratio ranging from 0.004 to 0.0016 or less. For example, IR-transmissive dome 300 having a wall thickness of 0.010 inches and a dome diameter of 4.9 inches would have a wall thickness to dome diameter ratio of 0.002.

In general, the overall diameter of IR-transmissive dome 300 may be limited by its structural integrity. For example, for a given material formed into a hemispherical dome, the buckling pressure may be approximated as being proportional to the square of the ratio of the wall thickness divided by the diameter, while the transmission may be approximated as being inversely proportional to the wall thickness. Therefore, a given diameter of IR-transmissive dome 300 may be limited based upon its desired structural integrity for a given desired minimum transmission requirement. For example, for a desired wall thickness to dome diameter ratio of 0.0016 and a minimum LWIR transmission requirement of 60%, the dome diameter would be approximately 9.4 inches (e.g., if made out of ultra-high molecular weight polyethylene).

As noted herein, IR-transmissive dome 300 is disclosed for IR imaging applications, which would not be possible using conventional, high-density polyethylene (HDPE) injection-molded IR-transmissive windows that are too thick (e.g., greater than 0.020 inches (or 20 mils)), too small in diameter (e.g., small, non-hemispherical windows), insufficiently rigid and/or having other undesirable properties (e.g., non-uniformities) and thus are only suited for passive IR motion detection applications where capturing images of high quality are not required. In general for one or more embodiments, IR-transmissive dome 300 may provide, for a desired imaging quality, a uniform, hemispherical dome that may have desirable properties in terms of dome uniformity, such as with respect to local uniformity (e.g., directed to image quality) and thickness variation (e.g., directed to IR transmission).

For example for an embodiment, IR-transmissive dome 300 may provide a desired finish (e.g., an A2 finish) on its surface and a peak-to-peak thickness variation of about 0.1 mil or less in any contiguous area defined by a pi/16 solid angle. Furthermore, for an embodiment, IR-transmissive dome 300 may have an overall uniformity such that the thickness variation would be about 1 mil or less over the entire optical surface of the hemispherical dome.

Furthermore for one or more embodiments, IR-transmissive dome 300 may provide a hemispherical dome having an approximately constant curvature. For example for an embodiment, the hemispherical dome may provide a curvature that varies by about 10% or less over the entire optical surface of the hemispherical dome (e.g., for each local area defined by a pi/16 solid angle, the radius of curvature deviates by about no more than 10% from the mean curvature of the hemispherical dome).

Figure 3C:
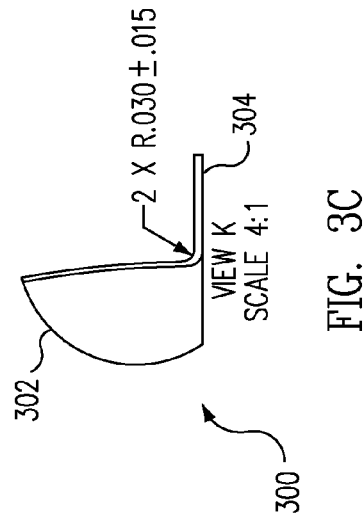
FIGS. 3A through 3D show a top level view, a cross-sectional side view, an expanded portion of the cross-sectional side view, and a top perspective view, respectively, of an infrared-transmissive dome in accordance with an embodiment.
Figure 3D:
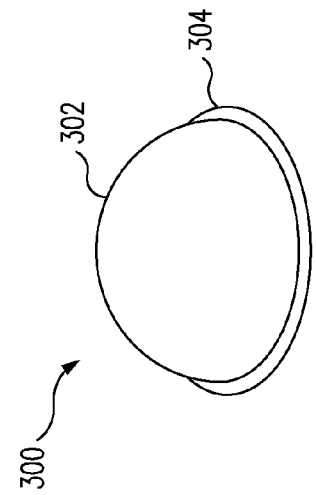
Figure 3B:
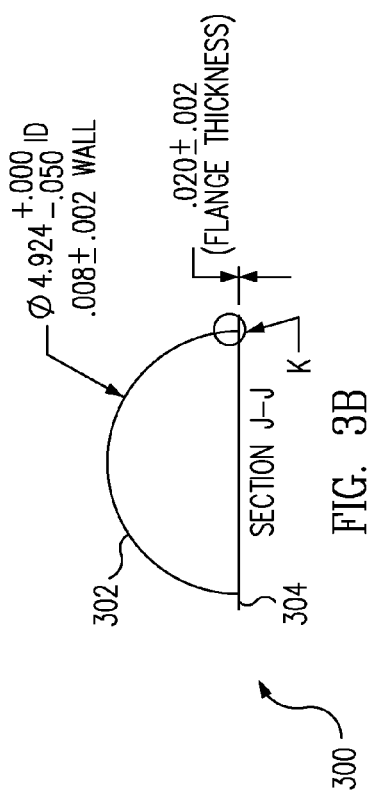
Figure 3A:
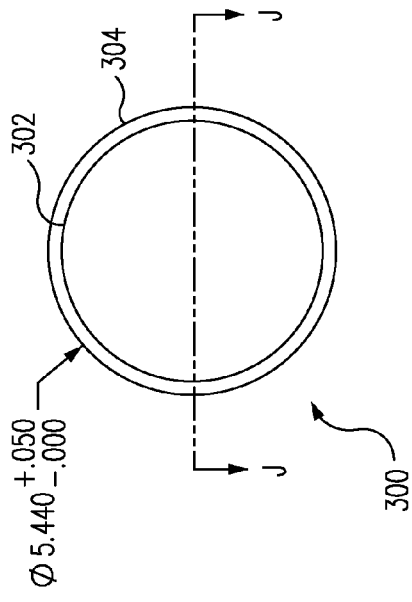
Figure 4A:
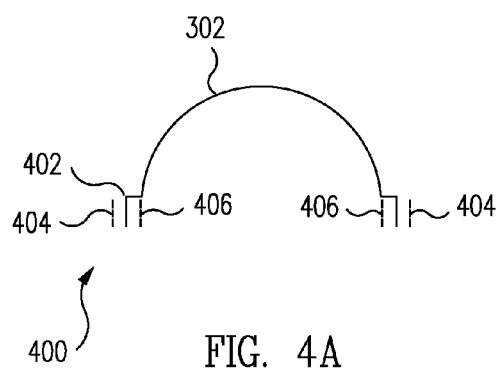
FIGS. 4A through 4D show various examples of infrared-transmissive domes in accordance with one or more embodiments.
Figure 4B:
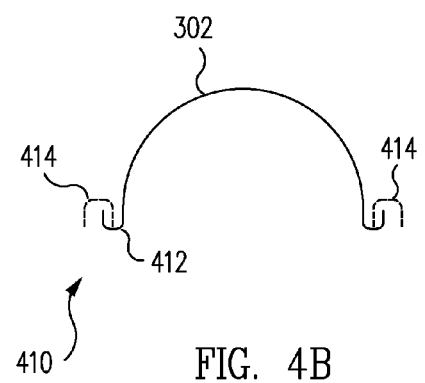
Figure 4C:
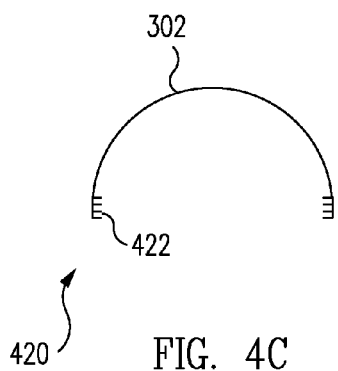
Figure 4D:
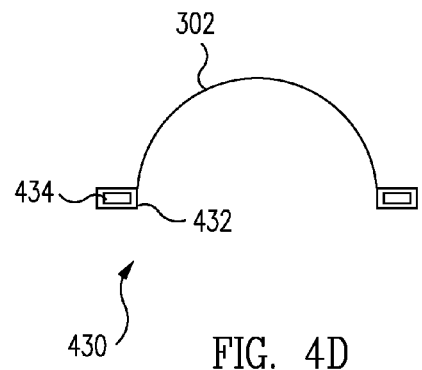

Flange 304 is optional and may be included and used to fasten IR-transmissive dome 300 to the particular enclosure or IR imaging system for a desired application. As shown in particular in FIGS. 3A-3C, flange 304 may have a greater wall thickness (e.g., 0.020±0.002 inches) than main dome body 302. FIG. 3C in particular shows an expanded view of a portion of FIG. 3B (from a section labeled K) to illustrate flange 304 and an example of a curved transition (e.g., having a radius of 0.030±0.015 inches) from flange 304 to main dome body 302. However, this is not limiting and flange 304 may be optional, depending upon the specific attachment design of IR-transmissive dome 300, or its dimensions may vary for the particular design requirements (e.g., thicker, stepped, curved, enveloping further structural components, such as a structural support ring, etc.).

For example, FIGS. 4A through 4D show various examples of infrared-transmissive domes (e.g., based on IR-transmissive dome 300) having main dome body 302 and various attachment techniques in accordance with one or more embodiments. Specifically, IR-transmissive domes 400, 410, 420, and 430 (FIGS. 4A, 4B, 4C, and 4D, respectively) each includes main dome body 302 and various techniques for coupling main dome body 302 to the enclosure or connection point for the particular IR imaging system for a desired application.

As an example, IR-transmissive dome 400 includes a stepped flange 402 that may be used to secure main dome body 302 to the IR imaging system. As an example, a compressive band 404 (e.g., a mounting band around the circumference) may be used to secure IR-transmissive dome 400 to a portion 406 of the IR imaging system. Alternatively for example, screws, rivets, or other fastening devices may be inserted through stepped flange 402 to portion 406 or an adhesive may be used to fix stepped flange 402 to portion 406.

As another example, IR-transmissive dome 410 may include a curved flange 412 (or other type of shaped flange) to mate with a corresponding portion 414 of the IR imaging system. As another example, IR-transmissive dome 420 may be slip fit into a recess (e.g., a circular lip) and compressively and/or adhesively held in place. Alternatively, for example, a flange 422 may include threads (e.g., via a thicker flange portion or via a threaded metal ring enveloped within flange 422) to thread onto corresponding threads of the IR imaging system.

As another example, IR-transmissive dome 430 may have a flange 432 that includes a metal ring 434 that provides structural support for flange 432 and allows a compressive fit or other known fastening techniques to be used as would be understood by one skilled in the art. It should also be understood that these various techniques may be combined and implemented as desired to meet the requirements for a given application.

The IR-transmissive dome (e.g., IR-transmissive dome 108, 300, and/or 400-430) for one or more embodiments may be made of ultra-high molecular weight polyethylene (UHMWPE) or very-high molecular weight polyethylene (VHMWPE). These polyethylene compositions (VHMWPE and UHMWPE) have exceptional wear resistance and, in accordance with one or more embodiments, produce hemispherical domes with substantially higher resistance to buckling when compared to similar domes made of HDPE. HDPE is a linear polymer with a density above 0.941 grams/cubic centimeter and molecular weight typically below 200,000 g/mol. UHMWPE and VHMWPE, by contrast, have a lower density (typically 0.935-0.930 g/cc), but molecular weights on the order of ten times larger than HDPE (e.g., 5,000,000 g/mol).

As an example for UHMWPE (e.g., molecular weights exceeding two million (atomic mass units, u)), various representative materials include Stamylan® UH034, GUR® 4150, GUR® 4120, and GUR® X143. As an example for VHMWPE (e.g., molecular weights of approximately one-half to one million or more), various representative materials include GUR® GHR 8110 and GUR® Hostalloy 731.

In general in accordance with one or more embodiments, various types of additives may also be included to the polyethylene material, such as to provide protection (e.g., inhibit weathering) to the polyethylene material and/or to add desired coloration or tinting (e.g., to make the IR-transmissive dome opaque or translucent to the unaided eye of an observer). As an example for one or more embodiments, zinc sulfide (ZnS), titanium dioxide ($TiO_2$), and/or zinc oxide (ZnO) may be included with the polyethylene material to form the IR-transmissive dome having a white or generally cloudy, off-white color.

As a further example for one or more embodiments, a silicon (Si, e.g., in a powder form) or a dye-based additive may be included to provide a dark (e.g., black or charcoal) dome color to the IR-transmissive dome. Other additives may also be used, for example, such as Nigrosine (e.g., 0.25% to 1% by weight) or Plano black (e.g., 0.25% by weight), both produced for example by Orient Chemical Industries Ltd., to darken or tint the IR-transmissive dome. The various additives provided will generally obscure visible light (e.g., to obscure IR camera pointing direction) while minimally interfering with IR transmission.

For example, IR photons tend to interact with particles that are close to, equal to, or larger than the wavelength of the IR photon. Thus, as an example embodiment, additives may be selected that have particle sizes that are much smaller than the wavelength of the IR photon to minimize interaction and IR absorption.

The zinc oxide (e.g., nano-sized form) may also provide ultraviolet (UV) resistance for the polyethylene material of the IR-transmissive dome or an additional UV stabilizer may be added. For example, the UV stabilizer may be made, for example, from an oligomeric-hindered amine-light stabilizer (e.g., made by 3V Sigma). The UV stabilizer may function to hinder UV damage to the polyethylene by inhibiting the chemical breakdown initiated by UV light absorption (e.g., inhibit reactive degradation byproducts that cause molecular damage within the polyethylene due to UV exposure), but UV stabilizers also tend to degrade IR transmission. Additional UV stabilizers may include a hindered amine light stabilizer (HALS), which does not necessarily absorb UV but rather inhibits the chemical breakdown process that is initiated when UV is absorbed by a polymer. For example, UV stabilizers Tinuvin® 765, Tinuvin® 770, Tinuvin® 783, and/or Chimassorb® 994 (from Ciba Specialty Chemicals Corp.) may be included with the HDPE material to provide UV protection with minimal IR absorption.

In general, pure polyethylene (PE) may require UV protection, which may be provided in accordance with one or more embodiments by the addition of additives or by the addition of a thin sheet of UV blocking material (e.g., PE incorporating a thin layer of a very high concentration of UV absorber, such as nano-sized ZnO) to cover the IR-transmissive dome. Alternatively, as an example for an embodiment, a thin sheet of polyethylene (e.g., 0.001 inches) that includes a UV absorber (e.g., zinc oxide) may be laminated to the IR-transmissive dome to provide the desired level of UV protection.

Furthermore, various compositions may be selected in accordance with one or more embodiments, such as for example Stamylan® UH034 and GUR® GHR 8110 along with 0.5 to 1.0% ZnS and optionally a 0.0 to 0.5% UV stabilizer or alternatively ZnO (e.g., 1 to 8% by weight) substituted for ZnS, which may also provide UV protection properties (e.g., to retard weathering of the HDPE material). For example, the ZnO may consist of nano-sized particles (e.g., 60 nanometers in average particle diameter) that are infused into the selected HDPE powder to ensure uniform dispersion and to minimize clumping of the ZnO. The ZnO may provide, for example, up to 100% attenuation of the UV over a penetration distance of 0.010 inches with minimal IR transmission loss at ZnO levels of 2% by weight.

Figure 5:
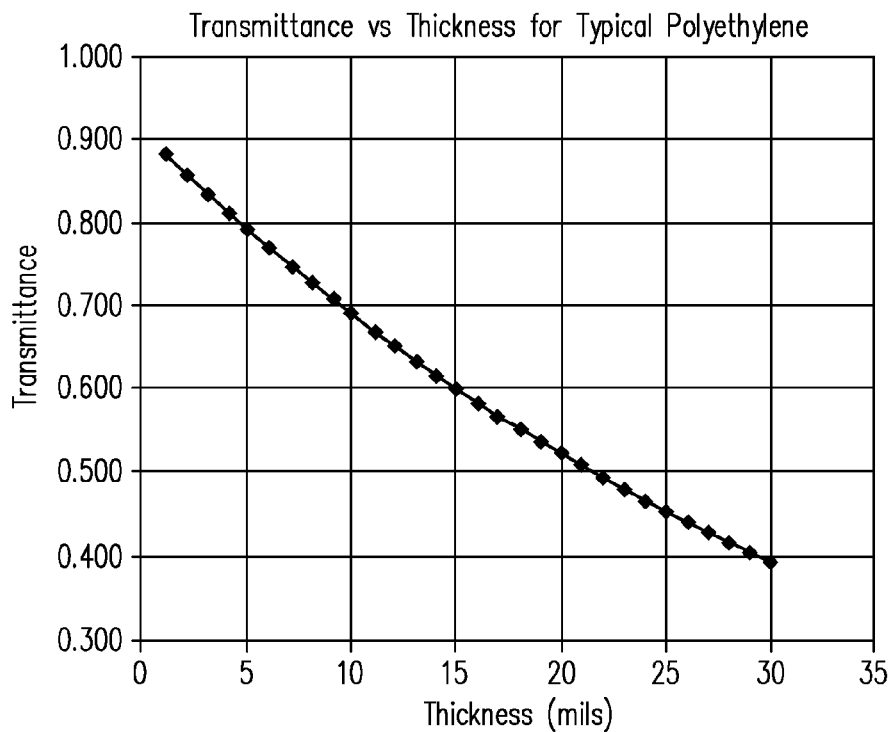
FIG. 5 shows a graph illustrating an example of long wavelength infrared transmittance versus thickness for a sample type of polyethylene in accordance with an embodiment.

As an example for one or more embodiments, various forms of polyethylene with optionally various additives are disclosed to form the IR-transmissive dome, such that absorption in the IR wavelengths (e.g., 8 to 13 micrometer wavelengths (LWIR spectrum)) is minimized to maximize IR transmission through the IR-transmissive dome. For example, FIG. 5 shows a graph illustrating an example of infrared transmittance versus thickness for a sample type of polyethylene in accordance with an embodiment. In general, the graph illustrates that for IR transmission within an acceptable range, such as for example greater than 0.700 (or 70%), the wall thickness of the IR-transmissive dome must be approximately 0.010 inches (10 mils) or less. For example, an acceptable wall thickness may fall within 0.005 to 0.012 inches to provide acceptable IR transmission (e.g., 65% transmission) through the IR-transmissive dome for a desired IR imaging application.

The IR-transmissive dome may have various physical characteristics, depending upon the requirements for a desired application. For example, a minimal wall thickness may be desired to optimize transmission through the IR-transmissive dome, but a certain wall thickness may be required to provide sufficient strength, rigidity, and resistance to weathering. As a specific example, a wall thickness for the IR-transmissive dome of 0.007 inches (7 mils) would provide approximately 75% IR transmission and may provide sufficient strength for some applications. As an example, VHMWPE and UHMWPE provide greater strength for a given thickness, relative to conventional HDPE, and also may provide desired levels of abrasion resistance, impact resistance, and retention of mentioned properties across extreme temperature ranges (e.g. −40 to +80 degrees Celsius).

Figure 6:
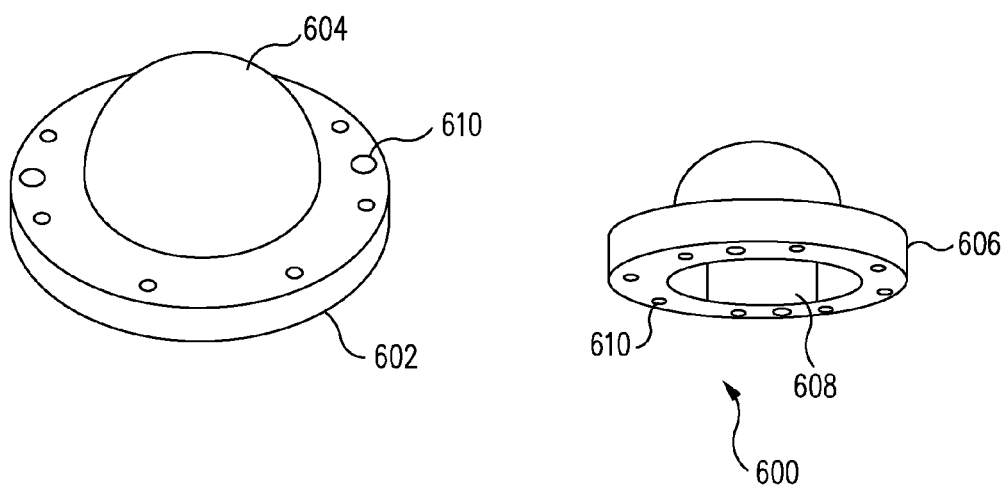
FIG. 6 shows an example of a compression mold for manufacturing an infrared-transmissive dome in accordance with an embodiment.

FIG. 6 shows an example of a compression mold 600 for manufacturing an IR-transmissive dome in accordance with one or more embodiments. Compression mold 600 includes a compression mold portion 602 and a corresponding compression mold portion 606. Mold portion 602 includes a convex portion 604 that corresponds to a concave portion 608 of mold portion 606 such that convex portion 604 inserted into concave portion 608 may conform the UHMWPE and/or VHMWPE placed within mold 600 (e.g., between convex portion 604 and concave portion 608) to a desired shape and thickness for the IR-transmissive dome.

Mold portions 602 and 606 may include, for one or more embodiments, attachment and/or release structures 610, such as bolt holes, screw holes, indents, etc. that may correspond to provide techniques to secure mold portion 602 to mold portion 606 (e.g., and may provide some compressive force) and/or assist in separating mold portion 602 from mold portion 606. For example, structures 610 may include one or more threaded bolt holes on mold portion 602 and corresponding indents 610 on mold portion 606 to assist in separating mold portion 602 from mold portion 606, as would be understood by one skilled in the art.

Compression mold 600 may also include various types of surface treatments in accordance with one or more embodiments. For example, a surface finish of convex portion 604 and/or concave portion 608 may be polished to provide a surface finish for an embodiment of between approximately 8 L and 4 L.

Figure 7:
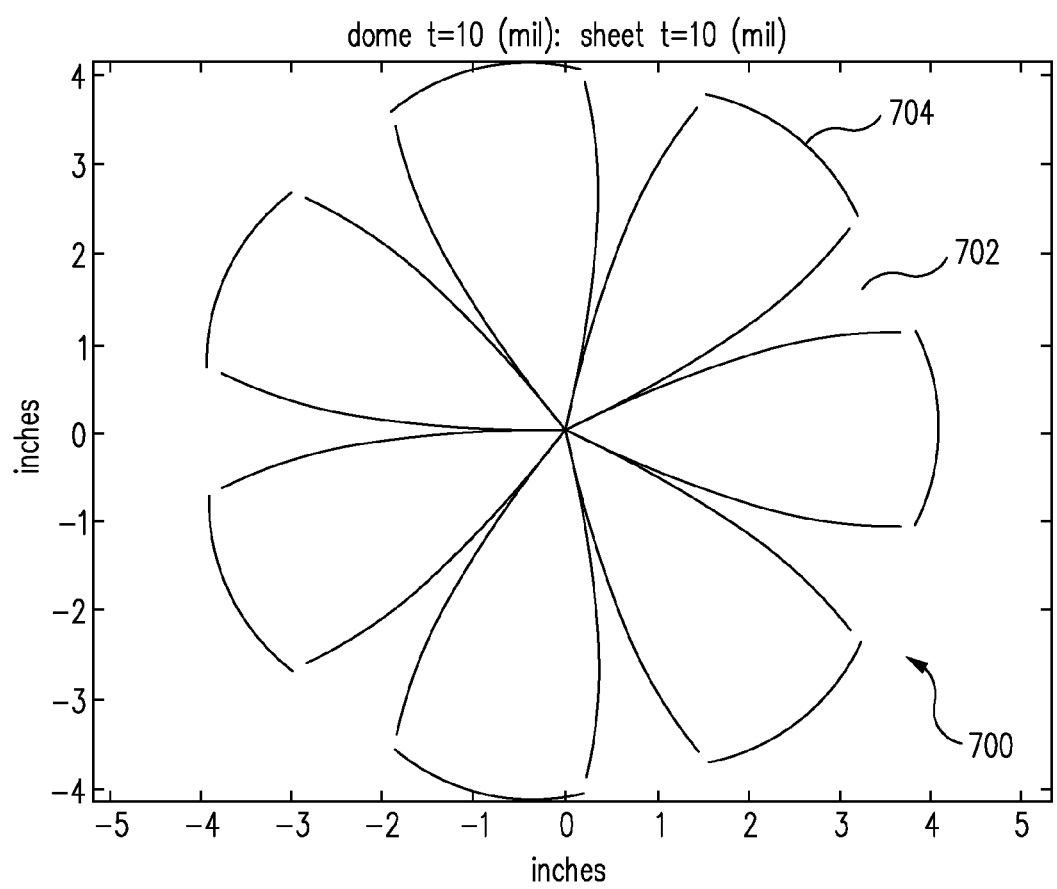
FIG. 7 shows an example of a polyethylene sheet for forming within the compression mold of FIG. 6 an infrared-transmissive dome in accordance with an embodiment.

FIG. 7 shows an example of a sheet 700, made of UHMWPE and/or VHMWPE, for forming within the compression mold of FIG. 6 an infrared-transmissive dome in accordance with an embodiment. Sheet 700 may be sliced (e.g., skived), for example for an embodiment, from a block of UHMWPE and/or VHMWPE material (e.g., sheet stock) or extruded to provide the sheet. As an example, sheet 700 may be sliced and cut into specific shapes to allow proper sizing and placement into the particular compression mold (e.g., compression mold 600).

For example, sheet 700 may optionally include cutouts 702, in accordance with one-or more embodiments, to prevent sheet 700 from overlapping itself or bunching up at edges 704 during the molding process. Cutouts 702 may represent portions of the edge of sheet 700 removed and may be provided in various shapes, including triangular cutouts, serrated edges, or other shapes or forms.

Sheet 700 may also represent one or more layers of material. For example for an embodiment, sheet 700 may include a first UHMWPE material layer and at least a second layer (e.g., an overlay), such as another UHMWPE material layer filled with an additive or other additional material (e.g., to block visible light or UV) as discussed herein in accordance with one or more embodiments.

Figure 8:
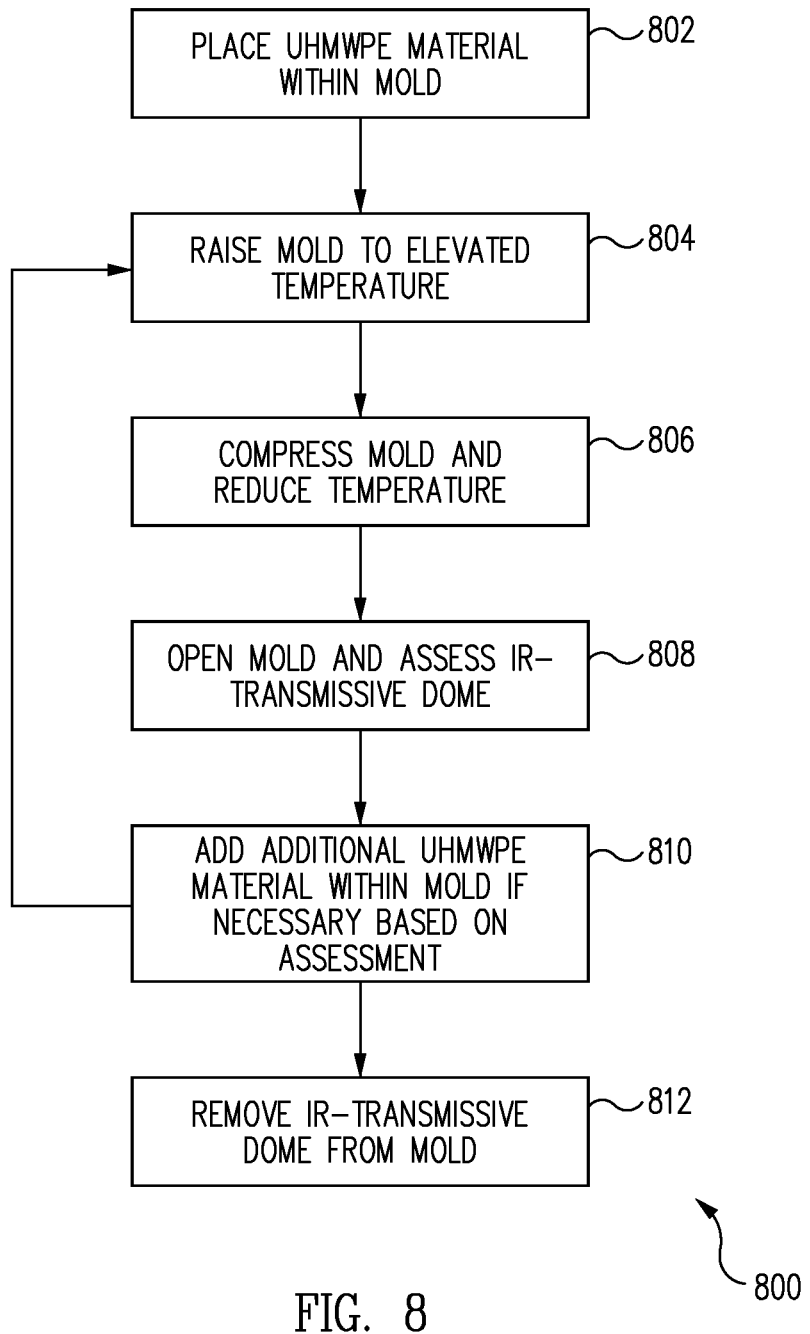
FIG. 8 shows a flowchart for making an infrared-transmissive dome in accordance with an embodiment.

FIG. 8 shows a flowchart 800 for making an infrared-transmissive dome in accordance with an embodiment. For the molding process for an embodiment, UHMWPE material is placed within the compression mold (block 802), such as compression mold 600 (FIG. 6). For example, sheet 700 (e.g., made of UHMWPE) may be placed between mold portion 602 and mold portion 606 (e.g., placed over convex portion 604 or within concave portion 608 of FIG. 6), with convex portion 604 then aligned within concave portion 608 for the molding process using compression mold 600.

Alternatively for one or more embodiments, UHMWPE material comprising powder, pellets, or other material forms may be placed within compression mold 600. As an example, the powder and/or pellets may be placed within concave portion 608 of mold portion 606 or the UHMWPE material may be applied to convex portion 604 and/or concave portion 608 as a powder coat or other type of approximately uniform application. As a specific example, powder coating techniques may be used to apply the UHMWPE material to compression mold 600 to provide a uniform layer of the UHMWPE material for the molding process. Similarly for one or more embodiments, VHMWPE or a mixture of VHMWPE and UHMWPE may be substituted for the UHMWPE material discussed in reference to FIG. 8 as would be understood by one skilled in the art.

The temperature of compression mold 600, with the UHMWPE material disposed between convex portion 604 and concave portion 608, is then elevated to a desired temperature for the specific material to allow the molding process to occur (block 804). The elevated temperature, for example, may be between 200 and 300° C. (e.g., 220 to 230° C.) for a period of time (e.g., 45 minutes). As an example, compression mold 600 may be placed in an oven to raise the temperature, with the compressive weight of mold portion 602 bearing down on the UHMWPE material within mold portion 606.

At approximately around the elevated temperature, additional pressure may be applied to compression mold 600. For example, the additional pressure (e.g., 10-100 tons) may be applied to compression mold 600 while still in the oven or shortly after removal (e.g., while compression mold 600 remains at the elevated temperature). While under the additional pressure, compression mold 600 is allowed to cool (block 806).

It should be understood, however, that the amount of pressure and the specific temperature are related and their values may vary depending upon the type and size of UHMWPE material, such that the UHMWPE material forms and knits together to provide the IR-transmissive dome, as would be understood by one skilled in the art. For example, the amount of pressure required may increase as the molecular weight of the UHMWPE material increases, as the diameter of the dome increases, and/or as the thickness decreases.

The additional pressure is removed and the IR-transmissive dome is removed from compression mold 600 (block 812). To assist with the removal of the IR-transmissive dome (e.g., to prevent sticking and damage to the dome), a mold surface treatment may be applied to compression mold 600. For example, a NanoMoldCoating™ surface treatment (manufactured by PCS Company) may be applied to the inner surfaces of compression mold 600 (e.g., convex portion 604 and concave portion 608) to treat the surfaces and achieve a low-friction mold surface over areas in contact with the UHMWPE material.

A remolding or a multi-step molding process may also be performed based upon flowchart 800 to further mold the IR-transmissive dome, as would be understood by one skilled in the art. For example, prior to completing the IR-transmissive dome process and permanently removing the IR-transmissive dome from compression mold 600 (block 812), an optional assessment (e.g., analysis or inspection) of IR-transmissive dome may be performed, either while the IR-transmissive dome is still within compression mold 600 or upon removal (block 808).

If it is determined that IR-transmissive dome does not meet desired specifications (e.g., partly formed dome that may have gaps or other imperfections), additional UHMWPE material (e.g., powder or a portion of a sheet) may optionally be added to the IR-transmissive dome within compression mold 600 (block 810). For example, the IR-transmissive dome may have been formed from a sheet of UHMWPE material that did not properly flow uniformly within compression mold 600. However, this problem may be corrected for the IR-transmissive dome by including additional UHMWPE material to fill in gaps or other problem areas and then repeating operations of flowchart 800 (e.g., blocks 804 through block 810 prior to block 812).

As noted above, it should be understood that the various process operations may be varied for forming an IR-transmissive dome as disclosed herein. For example for one or more embodiments, an IR-transmissive dome may be formed by a compression-mold process as follows:

i. Mold preparation (e.g., treat mold surface, which may not be necessary for every subsequent cycle);
ii. Heat oven to 230° Celsius;
iii. Place 8 to 10 grams of UHMWPE into mold concave cavity (e.g., as a powder or sheet stock) and join both halves of mold together, allowing the weight of the mold to press the two halves together;
iv. Place the closed mold into the oven and heat for 45 minutes at 230° Celsius;
v. Remove mold from oven and use a 20 ton press to force the mold to close such that the distance between the mold halves is uniform and minimized;
vi. Replace mold in oven at 230 Celsius for 15-30 minutes;
vii. Remove mold and press again (e.g., as in process operation v. above);
viii. Leave mold in press under pressure until mold has cooled to room temperature—active convective cooling may be used to accelerate the cooling; and
ix. Open mold and remove the IR-transmissive dome.

As a further example for one or more embodiments, an IR-transmissive dome may be formed by a compression-mold process as follows:

i. Mold is placed in a 200 ton vertical press with flat plates on the top and the bottom of the press to interface the press to the mold;
ii. With the mold at room temperature, approximately 8 to 15 grams of UHMWPE is added to the concave mold cavity (e.g., the amount of UHMWPE may vary based on the desired wall thickness and optional flange thickness of the IR-transmissive dome);
iii. The mold is closed and heat is applied to the dome through the interface plates that are heated to approximately 216° Celsius and approximately 90 tons of force is applied to the mold (e.g., the heating and pressing duration is approximately 10 minutes);
iv. The mold is then conductively cooled to approximately room temperature (e.g., in approximately 10 minutes) using the interface plates, which may cool the two halves of the mold at different rates to assist in the IR-transmissive dome preferentially separating from one half of the mold; and
v. The mold is separated and the IR-transmissive dome is removed.

Systems and methods are disclosed herein to provide an infrared-transmissive dome for infrared imaging applications. For example, in accordance with an embodiment, a UHMWPE-based IR-transmissive dome is disclosed that allows sufficient IR energy to pass through for IR imaging applications. In contrast, conventional IR-transmissive windows are made of expensive materials (e.g., germanium) or are not suitable for IR imaging applications (e.g., passive IR motion detectors may use various types of small, thick, IR-transmissive HDPE windows that allow simple motion detection but would not be adequate for IR imaging applications).

The IR-transmissive window, in accordance with one or more embodiments, may provide a weatherproof dome that may protect against dust, moisture, and abrasive debris (e.g., blowing sand and dust as specified in military standard environmental test methods and engineering guidelines, such as for example MIL STD 810E) and, for some embodiments, may obscure IR camera pointing direction. The IR-transmissive dome may reduce manufacturing costs of the IR camera by eliminating expensive, conventional IR-transmissive windows, dynamic seals, and other weatherproofing parts, reduce tolerance requirements of the IR camera, and remove the need for an aesthetically pleasing (i.e., difficult to manufacture) shape of the IR camera system (i.e., if the IR-transmissive dome obscures the IR camera).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected is:
1. An infrared-transmissive dome, comprising:
a main body providing a hollow, hemispherical-shaped dome;
wherein the main body is made of an ultra-high molecular weight or a very-high molecular weight polyethylene material; and
wherein the main body is self-supporting and has a wall thickness equal to or less than 0.012 inches and is configured to allow infrared transmittance greater than approximately sixty five percent through the main body for infrared imaging in a wavelength range of approximately three to fourteen micrometers.

2. The infrared-transmissive dome of claim 1, wherein a ratio of the wall thickness to a diameter of the infrared-transmissive dome is approximately 0.004 or less and the wall thickness is equal to or greater than approximately 0.005 inches.

3. The infrared-transmissive dome of claim 1, wherein a peak-to-peak variation of the wall thickness is approximately 0.0001 inches or less over any contiguous area defined by a pi/16 solid angle, a variation of the wall thickness is approximately 0.001 inches or less for the main body, and a radius of curvature of the main body varies by approximately ten percent or less from a mean radius of curvature over any contiguous area defined by a pi/16 solid angle.

4. The infrared-transmissive dome of claim 1, comprising:
a flange formed as part of and along an edge of the main body;
wherein the flange is made of the ultra-high molecular weight or very-high molecular weight polyethylene material; and
wherein the flange has a wall thickness greater than 0.010 inches.

5. The infrared-transmissive dome of claim 4, wherein the flange comprises a metal ring enclosed at least partially within the ultra-high molecular weight or very-high molecular weight polyethylene material.

6. The infrared-transmissive dome of claim 4, wherein the flange comprises a stepped portion or a curved-shaped portion to mate with a corresponding portion of an enclosure for an infrared detector.

7. The infrared-transmissive dome of claim 1, wherein the main body is made of the ultra-high molecular weight polyethylene material and the very-high molecular weight polyethylene material.

8. The infrared-transmissive dome of claim 1, wherein the ultra-high molecular weight polyethylene material and/or the very-high molecular weight polyethylene material includes an additive to provide ultraviolet protection.

9. The infrared-transmissive dome of claim 8, wherein the additive includes a zinc sulfide, a titanium dioxide, a zinc oxide, an oligomeric-hindered amine-light stabilizer, and/or a hindered amine light stabilizer.

10. The infrared-transmissive dome of claim 1, comprising a thin sheet of the ultra-high molecular weight or very-high molecular weight polyethylene material layered over the main body, wherein the thin sheet has a wall thickness equal to or less than the wall thickness of the main body and includes an additive to provide ultraviolet protection and/or translucence to visible wavelengths, and wherein the infrared-transmissive dome provides greater than approximately sixty five percent transmission to infrared wavelengths within approximately eight to thirteen micrometers.

11. The infrared-transmissive dome of claim 1, wherein the ultra-high molecular weight or very-high molecular weight polyethylene material includes an additive such that the infrared-transmissive dome is generally translucent to visible wavelengths and provides greater than approximately sixty five percent transmission to infrared wavelengths within approximately eight to thirteen micrometers.

12. The infrared-transmissive dome of claim 11, wherein the additive includes a silicon material.

13. The infrared-transmissive dome of claim 1, wherein the infrared-transmissive dome is part of an infrared camera system having an infrared detector within a housing, and wherein the infrared-transmissive dome is coupled to the housing to allow infrared energy external to the housing to pass through to the infrared detector.

14. A compression mold for the infrared-transmissive dome of claim 1, the compression mold comprising:
a first mold portion having a convex portion; and
a second mold portion having a concave portion corresponding to the convex portion of the first mold portion;
wherein the convex portion disposed within the concave portion is configured to provide an approximately 0.012 gap or less between the convex portion and the concave portion such that the ultra-high molecular weight or the very-high molecular weight polyethylene material disposed between the convex portion and the concave portion, under an elevated temperature and with a compressive force applied to the compression mold, forms the infrared-transmissive dome that is self-supporting and having the wall thickness equal to or less than approximately 0.012 inches.

15. The compression mold of claim 14, wherein a surface finish of the convex portion and the concave portion are polished to between approximately 8L and 4L.

16. The compression mold of claim 14, wherein the convex portion and the concave portion are shaped such that a ratio of the wall thickness to a diameter of the infrared-transmissive dome is approximately 0.004 or less.

17. The compression mold of claim 14, wherein the convex portion and the concave portion are shaped such that a peak-to-peak variation of the wall thickness is approximately 0.0001 inches or less over any contiguous area defined by a pi/16 solid angle, a variation of the wall thickness is approximately 0.001 inches or less for the main body, and a radius of curvature of the main body varies by approximately ten percent or less from a mean radius of curvature over any contiguous area defined by a pi/16 solid angle.

18. A method of forming the infrared-transmissive dome of claim 1, the method comprising:
providing the ultra-high molecular weight or the very-high molecular weight polyethylene material within a compression mold to form the infrared-transmissive dome;
increasing a temperature of the compression mold;
applying pressure to the ultra-high molecular weight or very-high molecular weight polyethylene material via the compression mold;
decreasing the temperature of the compression mold; and
removing the ultra-high molecular weight or very-high molecular weight polyethylene material from the compression mold, wherein the ultra-high molecular weight or very-high molecular weight polyethylene material has been formed to provide the hollow, hemispherical-shaped dome having the main body that is self-supporting and with the wall thickness equal to or less than approximately 0.012 inches.

19. The method of claim 18, comprising:
inspecting the main body;
adding an additional amount of the ultra-high molecular weight or very-high molecular weight polyethylene material to certain areas of the main body that have undesired properties; and
repeating the increasing, the applying, and the decreasing operations followed by the removing of the infrared-transmissive dome from the compression mold formed from the ultra-high molecular weight or very-high molecular weight polyethylene material.

20. The method of claim 18, wherein the providing ultra-high molecular weight or very-high molecular weight polyethylene material within the compression mold is performed by a powder coat process.

21. The method of claim 18, wherein a ratio of the wall thickness to a diameter of the infrared-transmissive dome is approximately 0.004 or less, the wall thickness is equal to or greater than approximately 0.005 inches, and the infrared-transmissive dome is configured to allow infrared transmittance greater than approximately sixty five percent through the main body for infrared imaging in the wavelength range of approximately three to fourteen micrometers.

22. The method of claim 18, wherein a peak-to-peak variation of the wall thickness is approximately 0.0001 inches or less over any contiguous area defined by a pi/16 solid angle, a variation of the wall thickness is approximately 0.001 inches or less for the main body, and a radius of curvature of the main body varies by approximately ten percent or less from a mean radius of curvature over any contiguous area defined by a pi/16 solid angle.

23. The method of claim 18, wherein the ultra-high molecular weight or very-high molecular weight polyethylene material has been formed to provide a flange along an edge of the main body and having a flange wall thickness greater than 0.010 inches.

24. The method of claim 23, comprising providing a metal ring within the compression mold, wherein the metal ring is formed as part of the flange.

25. The method of claim 24, wherein the flange comprises a stepped portion or a curved-shaped portion to mate with a corresponding portion of an enclosure for an infrared detector.

26. The method of claim 18, wherein the main body is made of the ultra-high molecular weight polyethylene material and the very-high molecular weight polyethylene material.

27. The method of claim 18, wherein the ultra-high molecular weight or very-high molecular weight polyethylene material includes an additive to provide ultraviolet protection.

28. The method of claim 18, wherein the ultra-high molecular weight or very-high molecular weight polyethylene material comprises a powder or a sheet of the ultra-high molecular weight or very-high molecular weight polyethylene material.

29. The method of claim 18, comprising applying a superhydrophobic coating on the hollow, hemispherical-shaped dome.

30. The method of claim 18, wherein the ultra-high molecular weight or very-high molecular weight polyethylene material provided within the compression mold includes cutouts around an edge of the ultra-high molecular weight or very-high molecular weight polyethylene material.

31. The method of claim 18, comprising treating the compression mold with a mold surface treatment to provide a low-friction mold surface.

32. The method of claim 18, comprising disposing over the main body an additional thin sheet of the ultra-high molecular weight or very-high molecular weight polyethylene material, wherein the thin sheet has a wall thickness equal to or less than the wall thickness of the main body and includes an additive to provide ultraviolet protection and/or translucence to visible wavelengths, wherein the infrared-transmissive dome provides greater than approximately sixty five percent transmission to infrared wavelengths within approximately eight to thirteen micrometers.

33. The method of claim 18, wherein the ultra-high molecular weight or very-high molecular weight polyethylene material includes an additive such that the infrared-transmissive dome is generally translucent to visible wavelengths and provides greater than approximately sixty five percent transmission to infrared wavelengths within approximately eight to thirteen micrometers.

34. The method of claim 33, wherein the additive includes a silicon material.

* * * * *